(12) United States Patent
Gloeckler

(10) Patent No.: US 9,838,650 B2
(45) Date of Patent: Dec. 5, 2017

(54) PORTABLE OPTICAL SENSOR MODULE

(75) Inventor: Gerd Gloeckler, Weidenstetten (DE)

(73) Assignee: LEICA GEOSYSTEMS AG, Heerbrugg (CH)

( * ) Notice: Subject to any disclaimer, the term of this patent is extended or adjusted under 35 U.S.C. 154(b) by 897 days.

(21) Appl. No.: 13/995,473

(22) PCT Filed: Dec. 16, 2011

(86) PCT No.: PCT/EP2011/073081
§ 371 (c)(1),
(2), (4) Date: Jun. 18, 2013

(87) PCT Pub. No.: WO2012/084722
PCT Pub. Date: Jun. 28, 2012

(65) Prior Publication Data
US 2013/0278766 A1    Oct. 24, 2013

(30) Foreign Application Priority Data

Dec. 20, 2010   (DE) .................. 10 2010 063 531

(51) Int. Cl.
*H04N 7/18*       (2006.01)
*G01D 11/24*      (2006.01)

(52) U.S. Cl.
CPC ............ *H04N 7/18* (2013.01); *G01D 11/245* (2013.01)

(58) Field of Classification Search
CPC ...... G01D 11/245; H04N 7/18; Y10T 16/469; Y10T 16/4707; Y10T 16/4713; Y10T 16/4719; Y10T 16/528; Y10S 16/24; B25G 3/08; B25G 3/12; B25G 3/18
USPC ........................................ 348/144
See application file for complete search history.

(56) References Cited

U.S. PATENT DOCUMENTS

| 3,948,549 A | 4/1976 | Duran |
| 5,426,476 A * | 6/1995 | Fussell .................. B64D 47/08 348/E5.026 |
| 6,527,398 B1 | 3/2003 | Fetzer |
| 6,729,778 B1 * | 5/2004 | Wu ........................ F16M 11/14 248/181.1 |
| 8,534,720 B2 * | 9/2013 | Meyer .......................... 292/216 |
| 2010/0172642 A1 * | 7/2010 | Orf ........................ F16M 11/04 396/421 |
| 2011/0108685 A1 * | 5/2011 | Liu ........................ F16M 11/08 248/178.1 |

(Continued)

FOREIGN PATENT DOCUMENTS

| DE | 39 22 102 A1 | 1/1991 |
| DE | 20 2005 004 841 U1 | 6/2005 |
| DE | 101 34 120 B4 | 7/2009 |

OTHER PUBLICATIONS

DE Office Action dated Nov. 23, 2011 as received in application No. 10 2010 063 531.6.

*Primary Examiner* — Jamie Atala
*Assistant Examiner* — Fabio Lima
(74) *Attorney, Agent, or Firm* — Maschoff Brennan

(57) ABSTRACT

The invention relates to a portable optical sensor module having at least one locking device disposed on an outer side of the portable optical sensor module for releaseably attaching the portable optical sensor module to a carrier platform. The at least one locking device comprises a folding handle device forming a carry handle for the portable optical sensor module in an opened locked state of the at least one locking device.

19 Claims, 3 Drawing Sheets

(56) References Cited

U.S. PATENT DOCUMENTS

2011/0227351 A1* 9/2011 Grosdemouge ......... E05B 81/14
                                                       292/201

* cited by examiner

PORTABLE OPTICAL SENSOR MODULE

FIELD OF THE INVENTION

The invention relates so a portable optical sensor module having at least one looking apparatus arranged on an outer side of the portable optical sensor module for releasably mounting the portable optical sensor module on a carrier platform.

BACKGROUND

Portable optical sensor modules or optical devices, such as for example aerial picture cameras or LIDAR systems, are built into carrier platforms with passive and/or active attitude stabilization. Known optical devices with rigid carrying handles have the disadvantage that the optical device must be secured with additional elements (for example screw connections, adapter rings or the like) after it is placed into the carrier platform. Existing foldable or displaceable handles on such optical devices are frequently arranged unfavorably from an economical point of view (for example directly above the device) or do not satisfy the crash safety requirements according to DO 160.

SUMMARY

The present invention is based on the object of improving a portable optical sensor module of the type mentioned in the beginning with respect to the releasable mounting on a carrier platform.

This object is achieved according to the invention by a portable optical sensor module having at least one locking apparatus, which is arranged on an outer side of the portable optical sensor module, for releasably mounting the portable optical sensor module on a carrier platform, wherein the at least one locking apparatus has a foldable handle apparatus, which, in an opened locking state of the at least one locking apparatus, forms a carrying handle for the portable optical sensor module.

As a result, the optical device is advantageously provided with a locking apparatus, which serves in the unlocked state as a carrying handle. The optical device or the portable optical sensor module can be mounted or locked in a few steps and without tools or other auxiliary means, in particular while observing the crash safety requirements according to DO 160.

The at least one locking apparatus can have at least one locking catch, which, in the closed locking state of the at least one locking apparatus, at least partially encloses at least one receptacle of the carrier platform.

Furthermore, the locking apparatus can have at least one locking pawl, which, in the closed locking state of the at least one locking apparatus, at least approximately blocks the movement of the at least one locking catch.

Provision can furthermore be made, according to the invention, for at least one closure to be present on the at least one locking apparatus, which closure, in the closed locking state of the at least one locking apparatus, at least approximately blocks the movement of the at least one locking pawl of the at least one locking apparatus.

The foldable handle apparatus, at least one guide device, which is arranged in particular on the outer side of the portable optical sensor module, and at least one linear pull-out mechanism, which is guided therein and is preferably configured in two parts, can form at least one toggle lever linkage for closing the at least one locking apparatus.

The foldable handle apparatus can be connected to the at least one closure of the at least one locking apparatus via the at least one linear pull-out mechanism.

When the foldable handle apparatus is folded down, the at least one linear pull-out mechanism can be shortened and the at least one closure can be pushed down, as a result of which the at least one locking pawl is blocked in its movement.

In the closed locking state of the at least one locking apparatus, the foldable handle apparatus can at least approximately rest against the outer side of the portable optical sensor module.

The at least one locking apparatus can be closed simply by the foldable handle apparatus being folded down.

It is advantageous if in each case one locking apparatus is arranged on two mutually apposite outer sides of the portable optical sensor module.

Accordingly, the foldable handle apparatuses of the respective locking apparatuses on both sides can be used as carrying handles, in particular for a plurality of people.

The foldable handle apparatuses of the locking apparatuses can in addition be arranged at least approximately in one horizontal plane, that is to say the same horizontal plane.

The portable optical sensor module can be configured as an aerial picture camera for taking aerial pictures from planes or for example as LIDAR system or the like.

BRIEF DESCRIPTION OF THE DRAWINGS

Advantageous configurations and developments of the invention result from the dependent claims. An exemplary embodiment will be described below in principle with reference to the drawing, in which:

DETAILED DESCRIPTION

Figure 1:
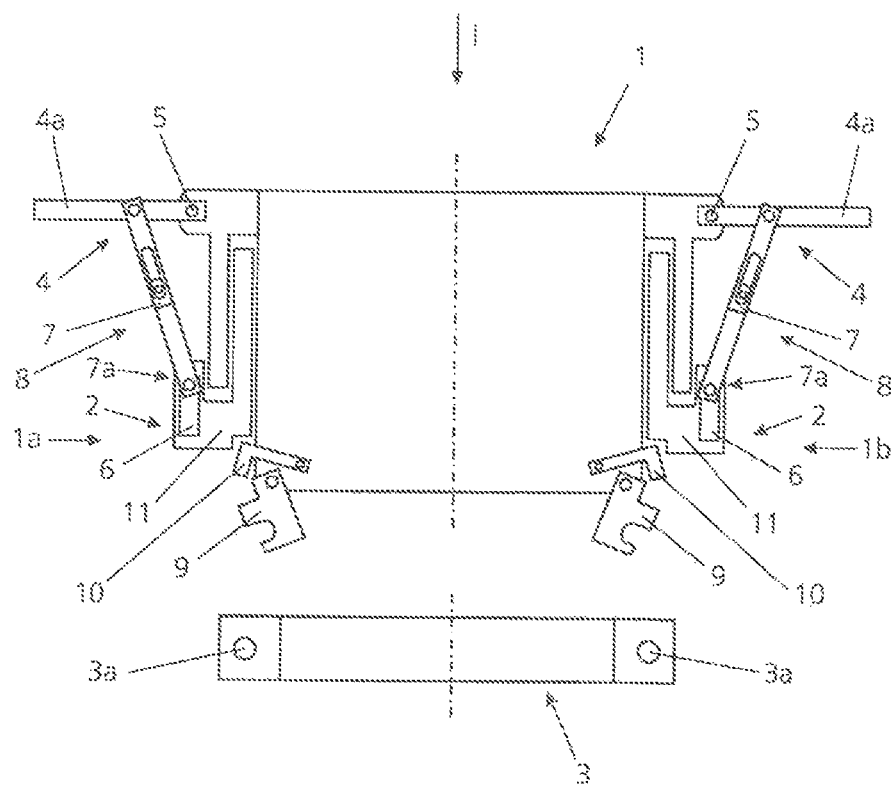
FIG. 1 shows a simplified side view of a portable optical sensor module according to the invention in the opened locking state and of a carrier platform.

The upper region of FIG. 1 shows a portable optical sensor module 1 according to the invention which is configured as an aerial picture camera for taking aerial pictures. In other exemplary embodiments (not illustrated), the portable optical sensor module could also be a LIDAR system for determining physical or chemical parameters of the atmosphere or the like.

In each case one locking apparatus 2 for releasably mounting the portable optical sensor module 1 on a carrier platform 3 is arranged on two mutually opposite outer sides 1a, 1b of the portable optical sensor module 1. The locking apparatuses 2 have in each case a foldable handle apparatus 4, which handle apparatuses form, in the opened locking state of the locking apparatuses 2 shown in FIG. 1, carrying handles 4a for the portable optical sensor module 1. The two foldable handle apparatuses 2 are located in a common horizontal plane.

In order to mount the two foldable handle apparatuses 4 on the two mutually opposite outer sides 1a, 1b of the portable optical sensor module 1, in each case one bearing 5 is provided such that the two foldable handle apparatuses 4 can be folded downwardly towards the portable optical sensor module 1 and can also be moved upwardly into the described horizontal plane. The respective foldable handle apparatus 4, in each case a guide device 6, which is arranged, on the outer side 1a, 1b of the portable optical sensor module 1, and in each case a linear pull-out mechanism 7, which is guided therein and is preferably configured in two parts, in each case form a toggle lever linkage 8 for closing the at least one locking apparatus 2. In the opened locking state shown in FIG. 1, the lower ends 7a of the linear pull-out mechanisms 7 are located in each case in the upper region of the guide devices 6. The linear pull-out mechanisms 7 also form the connecting elements to the further elements of the locking apparatuses 2, which are arranged on the two outer sides 1a, 1b of the portable optical sensor module 1 in each case below the foldable handle apparatuses 1. The locking apparatuses 2 in each case have a locking catch 9, which, in the closed locking state, at least partially encloses at least one receptacle 3a of the carrier platform 3. Furthermore, the respective locking apparatus 2 has a locking pawl 10, which, in the closed locking state of the respective locking apparatus 2, blocks the movement of the at least one locking catch 9. Moreover, a closure 11 is present on the respective locking apparatus 2, which closure in the closed locking state, blocks the movement of the locking pawl 10.

The locking apparatuses 2 thus enclose in each case a locking pawl 10, a locking catch 9, and a closure 11. For use of the portable optical sensor module 1, it may be necessary for it to be connected fixedly to the carrier platform 3. In the present exemplary embodiment, in each case two receptacles 3a are present on both ends of the carrier platform 3, such that the carrier platform 3 has a total of four receptacles 3a. The receptacles 3a serve, as mentioned above, for receiving the locking catches 9 of the two locking apparatuses 2, after the portable optical sensor module 1 has been placed on the carrier platform 3. The carrier platform 3 can also have passive and/or active attitude stabilization for operating the portable optical sensor module 1 during a flight.

Figure 2:
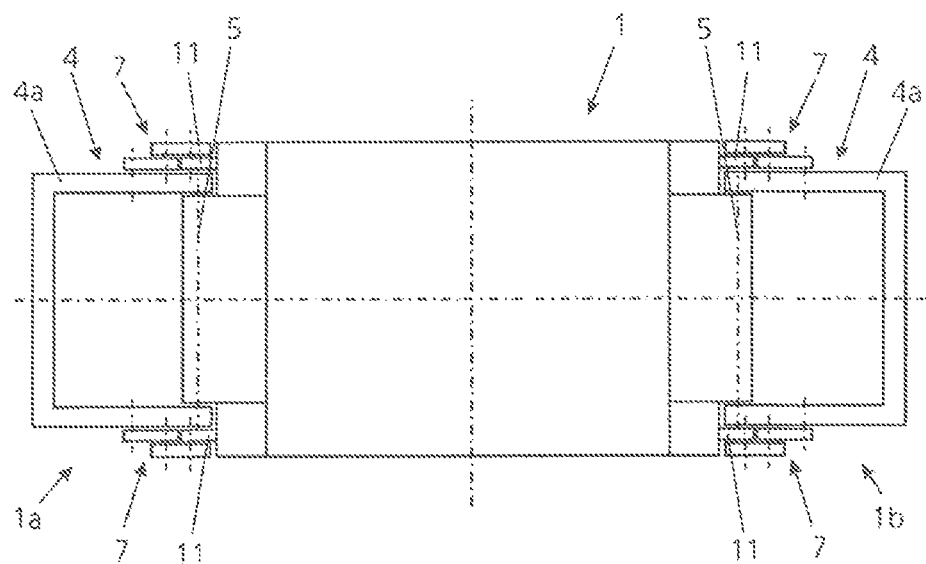
FIG. 2 shows a simplified plan view according to the arrow I from FIG. 1 of the portable optical sensor module according to the invention in the opened locking state.

FIG. 2 shows a plan view of the portable optical sensor module 1 according to the arrow I from FIG. 1, wherein the opened locking state is again illustrated. Shown here is in particular the possibility of the portable optical sensor module 1 being transported comparatively easily from one place to another using the foldable handle apparatuses 4 or the carrying handles 4a.

Figure 3:
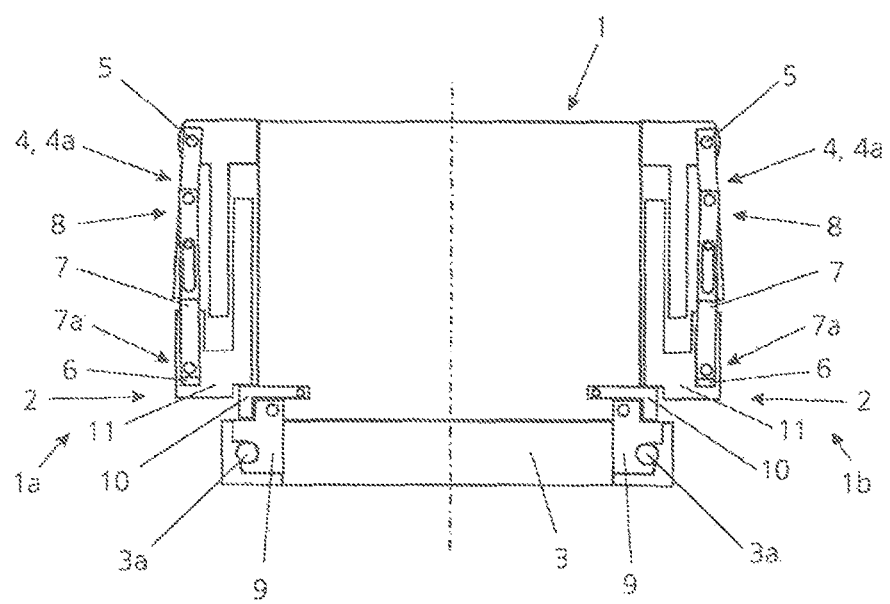
FIG. 3 shows a simplified side view of the portable optical sensor module according to the invention in the closed locking state.

FIG. 3 shows the portable optical sensor module 1 and the carrier platform 3 in a side view comparable to the view in FIG. 1. The portable optical sensor module 1 in this case was previously placed onto the carrier platform 3. Here, the two locking catches 9 in each case enclose the receptacle 3a of the carrier platform 3. The two foldable handle apparatuses 4 are folded to rest against the portable optical sensor module 1, and the locking apparatuses 2 are closed or in the closed locking state. The locking apparatuses 3 are closed by the foldable handle apparatuses 4, which are located on the respective outer side 1a, 1b, being folded. In this process, the linear pull-out mechanism 7, which is connected at the upper end to the foldable handle apparatus 4 and is guided at the lower end in the guide device 6, is moved downwardly. The linear pull-out mechanism 7 is in two parts and connected such that the linear pull-out mechanism 7 shortens when the foldable handle apparatus 4 is folded down. In this case, the closure 11 is also pushed down, such that ultimately the locking pawl 10 blocks the locking catch 9 in its movement. In the present exemplary embodiment, if both foldable handle apparatuses 4 are folded so rest against she portable optical sensor module 1, the portable optical sensor module 1 and the carrier platform 3 are fixedly connected to one another until the locking apparatus 2 is released. Release is in this case effected in reverse order of the closing of the locking apparatuses 2. In the closed locking state, the foldable handle apparatuses 4 at least approximately rest against the outer sides 1a, 1b.

What is claimed is:

1. A portable optical sensor module, which is configured as an aerial picture camera for taking aerial pictures from planes, comprising:
    a module housing having an outer surface and containing an optical sensor; and
    at least one locking apparatus mounted on an the outer surface of the module housing, for releasably mounting the portable optical sensor module on a carrier platform, wherein the at least one locking apparatus has a foldable handle apparatus having a handle that is rotatable with respect to the outer surface, which in an opened unlocked locking state of the at least one locking apparatus, the rotatable handle folds outward from the outer surface of the module housing and forms a carrying handle for the portable optical sensor module and in a closed locked locking state of the at least one locking apparatus, the rotatable handle folds inward toward the outer surface of the module housing, wherein the at least one locking apparatus includes at least one guide device associated with the at least one closure and at least one linear pull-out mechanism which is guided in the at least one guide device, wherein the at least one linear pull-out mechanism is configured in at least two parts that form at least one toggle lever linkage between the rotatable handle and the at least one guide device, which, in the closed locking state of the at least one locking apparatus the at least one linear pull-out mechanism is contracted and at an end of the at least one guide device farther from the rotatable handle so that the at least one closure locks at least one locking pawl and in the opened unlocked locking state of the at least one locking apparatus the at least one linear pull-out mechanism is expanded and at an end of the at least one guide device closer to the rotatable handle so that the at least one closure unlocks from and releases the at least one locking pawl.

2. The portable optical sensor module as claimed in claim 1, wherein the at least one locking apparatus has at least one locking catch operably associated with the rotatable handle, which, in the closed locking state of the at least one locking apparatus the at least one locking catch is in a locked position so as to be capable of at least partially coupling with at least one receptacle of the carrier platform and in the opened unlocked locking state of the at least one locking apparatus the at least one locking catch is in an unlocked position so as to be capable of uncoupling from the at least one receptacle.

3. The portable optical sensor module as claimed in claim 2, wherein the locking apparatus has at least one locking pawl between the rotatable handle and the at least one locking catch so as to be operably associated there with, which, in the closed locking state of the at least one locking apparatus the at least one locking pawl locks the at least one locking catch and at least approximately blocks rotation of the at least one locking catch and in the opened unlocked locking state of the at least one locking apparatus the at least one locking pawl unlocks from and releases the at least one locking catch so that the at least one locking catch is rotatable.

4. The portable optical sensor module as claimed in claim 3, wherein the at least one locking apparatus has at least one closure between the rotatable handle and the at least one locking pawl, which in the closed locking state of the at least one locking apparatus the at least one closure locks the at least one locking pawl and at least approximately blocks rotation of the at least one locking pawl and in the opened unlocked locking state of the at least one locking apparatus the at least one closure unlocks from and releases the at least one locking pawl so that the at least one locking pawl is rotatable.

5. The portable optical sensor module as claimed in claim 1, wherein the at least one guide device is a slot formed in the at least one closure such that the rotatable handle is connected to the at least one closure via the at least one linear pull-out mechanism.

6. The portable optical sensor module as claimed in claim 5, wherein, when the foldable handle apparatus is folded with the rotatable handle closer to the outer surface of the module housing so that the at least one locking apparatus is in the closed locking state, the at least one linear pull-out mechanism is shortened and the at least one closure is pushed against the at least one locking pawl, as a result of which the at least one locking pawl is blocked from rotating.

7. The portable optical sensor module as claimed in claim 1, wherein the at least one locking apparatus is in the closed locked locking state by the foldable handle apparatus being folded so that the rotatable handle is in a receptacle of the at least one locking apparatus on the outer side of the module housing of the portable optical sensor module.

8. The portable optical sensor module as claimed in claim 1, wherein a first locking apparatus is arranged on a first side of the outer surface of the module housing and a second locking apparatus is arranged on a second side of the outer surface of the module housing, the first side and second side being two mutually opposite outer sides of the module housing of the portable optical sensor module.

9. The portable optical sensor module as claimed in claim 8, wherein a first foldable handle apparatus of the first locking apparatus and a second foldable handle apparatus of the second locking apparatus are arranged at least approximately in the same horizontal plane.

10. A portable optical sensor module system comprising: the portable optical sensor module of claim 1, wherein the carrier platform has at least one receptacle member for coupling with the at least one locking apparatus.

11. The portable optical sensor module as claimed in claim 2, wherein the at least one locking apparatus includes a first locking apparatus is arranged on a first side of the outer surface of the module housing and a second locking apparatus is arranged on a second side of the outer surface of the module housing, the first side and second side being two mutually opposite outer sides of the module housing of the portable optical sensor module.

12. The portable optical sensor module as claimed in claim 3, wherein the at least one locking apparatus includes a first locking apparatus is arranged on a first side of the outer surface of the module housing and a second locking apparatus is arranged on a second side of the outer surface of the module housing, the first side and second side being two mutually opposite outer sides of the module housing of the portable optical sensor module.

13. The portable optical sensor module as claimed in claim 4, wherein the at least one locking apparatus includes a first locking apparatus is arranged on a first side of the outer surface of the module housing and a second locking apparatus is arranged on a second side of the outer surface of the module housing, the first side and second side being two mutually opposite outer sides of the module housing of the portable optical sensor module.

14. The portable optical sensor module as claimed in claim 1, wherein the at least one locking apparatus includes a first locking apparatus is arranged on a first side of the outer surface of the module housing and a second locking apparatus is arranged on a second side of the outer surface of the module housing, the first side and second side being two mutually opposite outer sides of the module housing of the portable optical sensor module.

15. The portable optical sensor module system comprising: the portable optical sensor module of claim 11, wherein the carrier platform has at least one receptacle member for coupling with the at least one locking catch of the first locking apparatus and at least one receptacle member for coupling with the at least one locking catch of the second locking apparatus.

16. The portable optical sensor module system comprising: the portable optical sensor module of claim 12, wherein the carrier platform has at least one receptacle member for coupling with the at least one locking catch of the first locking apparatus and at least one receptacle member for coupling with the at least one locking catch of the second locking apparatus.

17. The portable optical sensor module system comprising: the portable optical sensor module of claim 13, wherein the carrier platform has at least one receptacle member for coupling with the at least one locking catch of the first locking apparatus and at least one receptacle member for coupling with the at least one locking catch of the second locking apparatus.

18. The portable optical sensor module system comprising: the portable optical sensor module of claim 14, wherein the carrier platform has at least one receptacle member for coupling with the at least one locking catch of the first locking apparatus and at least one receptacle member for coupling with the at least one locking catch of the second locking apparatus.

19. A portable optical sensor module system comprising: the portable optical sensor module of claim 1, wherien the carrier platform has at least one receptacle member for coupling with the at least one locking catch of the at least one locking apparatus.

* * * * *

UNITED STATES PATENT AND TRADEMARK OFFICE
CERTIFICATE OF CORRECTION

| | | |
|---|---|---|
| PATENT NO. | : 9,838,650 B2 | Page 1 of 2 |
| APPLICATION NO. | : 13/995473 | |
| DATED | : December 5, 2017 | |
| INVENTOR(S) | : Gloeckler | |

It is certified that error appears in the above-identified patent and that said Letters Patent is hereby corrected as shown below:

On the Title Page

In Item (57), under "ABSTRACT", in Column 2, Line 3, delete "releaseably" and insert -- releasably --, therefor.

In the Specification

In Column 1, Line 5, delete "relates so" and insert -- relates to --, therefor.

In Column 1, Line 6, delete "looking" and insert -- locking --, therefor.

In Column 2, Line 15, delete "apposite" and insert -- opposite --, therefor.

In Column 2, Line 46, delete "invention" and insert -- invention, --, therefor.

In Column 2, Line 60, delete "foldable handle apparatuses 2" and insert -- foldable handle apparatuses 4 --, therefor.

In Column 3, Line 2, delete "arranged," and insert -- arranged --, therefor.

In Column 3, Line 14, delete "foldable handle apparatuses 1." and insert -- foldable handle apparatuses 4. --, therefor.

In Column 3, Line 22, delete "closure" and insert -- closure, --, therefor.

In Column 3, Line 53, delete "locking apparatuses 3" and insert -- locking apparatuses 2 --, therefor.

In Column 3, Line 65, delete "folded so rest against she portable" and insert -- folded to rest against the portable --, therefor.

Signed and Sealed this
Twelfth Day of June, 2018

Andrei Iancu
*Director of the United States Patent and Trademark Office*

In the Claims

In Column 4, Line 12, in Claim 1, delete "an the" and insert -- the --, therefor.

In Column 5, Line 2, in Claim 4, delete "which" and insert -- which, --, therefor.

In Column 5, Line 19, in Claim 6, delete "locking state," and insert -- locking state --, therefor.

In Column 5, Line 41, in Claim 10, delete "A portable" and insert -- The portable --, therefor.

In Column 5, Line 47, in Claim 11, delete "is arranged" and insert -- arranged --, therefor.

In Column 5, Line 49, in Claim 11, delete "is arranged" and insert -- arranged --, therefor.

In Column 5, Line 55, in Claim 12, delete "apparatus is arranged on" and insert -- apparatus arranged on --, therefor.

In Column 6, Line 2, in Claim 12, delete "is arranged" and insert -- arranged --, therefor.

In Column 6, Line 8, in Claim 13, delete "is arranged" and insert -- arranged --, therefor.

In Column 6, Line 10, in Claim 13, delete "is arranged" and insert -- arranged --, therefor.

In Column 6, Line 16, in Claim 14, delete "is arranged" and insert -- arranged --, therefor.

In Column 6, Line 18, in Claim 14, delete "is arranged" and insert -- arranged --, therefor.

In Column 6, Line 50, in Claim 19, delete "A portable" and insert -- The portable --, therefor.

In Column 6, Line 51, in Claim 19, delete "wherien" and insert -- wherein --, therefor.